United States Patent [19]

Toelke

[11] Patent Number: 5,065,617
[45] Date of Patent: Nov. 19, 1991

[54] MULTIPLE DIAMETER PIPE TEST END CLOSURE

[75] Inventor: Lester W. Toelke, Bellville, Tex.

[73] Assignee: Jack W. Hayden, Houston, Tex.

[21] Appl. No.: 490,716

[22] Filed: Mar. 8, 1990

[51] Int. Cl.$^5$ .................................................. G01M 3/28
[52] U.S. Cl. ...................................... 73/49.8; 73/49.5
[58] Field of Search .................. 73/49.8, 49.5, 49.6, 73/46, 49.1

[56] References Cited

U.S. PATENT DOCUMENTS

| 774,709 | 11/1904 | Thompson . | |
| 1,060,586 | 5/1913 | Clark . | |
| 1,331,360 | 2/1920 | Parsons et al. . | |
| 2,035,925 | 3/1936 | Seamark . | |
| 2,671,338 | 3/1954 | Reichl | 73/37 |
| 2,707,388 | 5/1955 | Kent | 73/37 |
| 2,780,294 | 2/1957 | Loomis | 166/203 |
| 3,095,729 | 7/1963 | McConnell | 73/49.1 |
| 3,179,127 | 4/1965 | Terry | 138/90 |
| 3,331,238 | 7/1967 | Kost et al. | 73/49.5 |
| 3,356,377 | 12/1967 | Voitik | 277/40 |
| 3,371,521 | 3/1968 | Hauk | 73/46 |
| 3,464,708 | 9/1969 | Hamilton | 277/151 |
| 3,710,628 | 1/1973 | Horton | 73/49.5 |
| 3,970,321 | 7/1976 | Dechavanne | 277/188 |
| 4,010,633 | 3/1977 | Hasha | 73/46 |
| 4,085,942 | 4/1978 | Yoshida et al. | 277/30 |
| 4,149,731 | 4/1979 | Yoshida et al. | 277/188 |
| 4,254,655 | 3/1981 | Keast et al. | 73/49.5 |
| 4,362,049 | 12/1982 | Horton | 73/49.6 |
| 4,377,185 | 3/1983 | Katz | 138/90 |
| 4,416,147 | 11/1983 | Hasha | 73/49.6 |
| 4,430,887 | 2/1984 | Roberts et al. | 73/49.8 |
| 4,458,522 | 7/1984 | Toelke | 73/49.5 |
| 4,646,559 | 3/1987 | Toelke | 73/46 |
| 4,646,561 | 3/1987 | Toelke | 73/49.5 |
| 4,766,934 | 8/1988 | Ollivaud et al. | 73/49.1 |

FOREIGN PATENT DOCUMENTS

| 809857 | 5/1951 | Fed. Rep. of Germany | 73/49.5 |
| 3419500 | 11/1985 | Fed. Rep. of Germany | 73/49.5 |
| 3425114 | 1/1986 | Fed. Rep. of Germany | 73/49.1 |
| 1401761 | 4/1965 | France | 73/49.5 |
| 501244 | 1/1976 | U.S.S.R. | 73/49.5 |
| 1154570 | 5/1985 | U.S.S.R. | 73/49.5 |

Primary Examiner—Hezron E. Williams
Assistant Examiner—Joseph W. Roskos
Attorney, Agent, or Firm—Jack W. Hayden

[57] ABSTRACT

A test head for enclosing pipe ends to test any diameter pipe within a plurality of pipe diameters in a preselected range which test head has a seal ring assembly which has a resilient body with a counterbore of a larger volume than non-resilient segments in the counterbore and mounted on the body to provide a volumetric space or gap between the segments and resilient body to enable the resilient body to initially move in response to fluid pressure toward sealing relation with the pipe without engaging the non-resilient segments.

3 Claims, 2 Drawing Sheets

MULTIPLE DIAMETER PIPE TEST END CLOSURE

STATEMENT OF THE PRIOR ART

Various test heads have been provided and used for enclosing the ends of a tubular member, such as a pipe, for internal fluid testing thereof. However, the structure and sealing arrangement of such test head is such that the seal is exposed within the bore of the test head which receives the pipe to be tested. It is not uncommon for the pipe end to contact or engage the seal and damage it as it is inserted into the test head, or when the pipe is removed from the test head after testing. When damage occurs as the pipe end is inserted into the test head, such damage may not be detected until an effort is made to effect a seal with the pipe when fluid test pressure is applied to test the pipe whereupon a leak occurs.

This necessitates removal of the pipe, disassembly of the test head to replace the seal, replacing the seal, reassembly of the test head and reinserting the pipe in the bore of the test head for testing. It can be appreciated that this procedure is time consuming and costly as the seals are expensive and the interruption of the test procedure substantially increases the test time for each joint of pipe.

The problem is further compounded in that test pressure, in some instances, may approach 5,000 to 10,000 PSI or more which not only requires a seal that seals effectively even on rough surfaces such as forgings, but one that is structured to withstand any extrusion of the sealing element during the fluid testing of the pipe. The problem is further compounded where smaller diameter pipe is received in a larger diameter bore of a test head so that the seals heretofore used with such devices may be more readily exposed to the pipe ends as the pipe is inserted in the bore of the test head, and greater radial distances must be travelled by the seal before effecting a seal with the pipe. In prior art structures this has exposed the seal to the fluid test pressure employed in testing the pipe in a manner so that the seal is more likely to extrude and fail during the test even where it is not damaged, thus requiring in some instances more frequent replacement of the seals which can also be costly and time consuming. Also, where the pipe has "upset ends", the prior art seal structure may be more subject to damage when the pipe is inserted in and removed from the test head.

When fluid testing of pipe either at mills or in the field, it is desirable that the test procedure be accomplished at the pressure desired in a minimum amount of time with a minimum amount of down time due to failure of the equipment.

Some seal assemblies have been provided including a resilient body formed of a suitable elastomer or the like and anti-extrusion segments mounted on the body. However, contraction of the seal assembly into sealing engagement with the pipe by the fluid pressure that acts on the seal may cause the segments to pinch, cut or engage the elastomer in an undesirable manner since such segments are generally mounted adjacent or in contact with the resilient element. Also, in prior art arrangements friction between the non-resilient segments and the resilient seal member may delay expansion of the seal assembly when the pressure is relieved thus increasing the test time of a pipe.

The present invention overcomes the above and other problems encountered with pipe end closures presently in use for fluid testing pipe. More specifically, the present invention provides a test head structure that is capable of testing a plurality of pipe diameters within any preselected or predetermined range of pipe diameters. The test head structure is such that the seal arrangement employed is protected regardless of the pipe diameter being tested within the preselected, predetermined range of pipe diameters and the seal is protected from pipe contact within the bore of the test head which substantially reduces if not complete eliminates the problem of seal damage due to contact with the pipe end as it is inserted into the bore of the test head for testing, or as the pipe is withdrawn from the test head after testing.

Also, the test head structure is such that the seal assembly includes a resilient member which is protected adjacent each annular end by non-resilient members which inhibits damage to the resilient member. The structure enables the seal assembly including the resilient body and the non-resilient protecting members to project or extend into the longitudinal bore of the test head which enables the seal assembly to be positioned closer to the pipe when smaller pipe diameters are being tested in the longitudinal bore to thereby reduce the travel of the seal assembly to effect a seal with the smaller diameter pipe. This positions the non-resilient enclosure for the resilient body adjacent the pipe to be tested which further inhibits extrusion of the resilient body when subjected to the pressure of the testing fluid while still protecting the resilient body from contact with the pipe as it is inserted into and removed from the test head.

Further, the test head is constructed and arranged so that it can test pipe which has a coupling or thread protector thereon; it will receive plain end, upset and other special pipe ends. It will also receive crooked end pipe without seal damage. Also, the present invention provides a seal assembly which is constructed and arranged to enable the resilient seal body to move substantially before it contacts the non-resilient segments which move with the resilient body. The movement of the resilient body without engaging the non-resilient reinforcing that moves with the resilient body reduces the likelihood of damage to the resilient element and reduces the friction between the resilient body and the non-resilient segments both during contraction of the seal assembly into sealing engagement with the pipe and retraction therefrom. One form of the present invention provides an arrangement for testing upset pipe, such as oil and gas well tubing which has a coupling on one end which requires no special equipment to hold the test head on the pipe to prevent columnar buckling.

Other objects and advantages of the present invention will become apparent from consideration from the following drawings.

DESCRIPTION OF THE PREFERRED EMBODIMENTS

Figure 1:
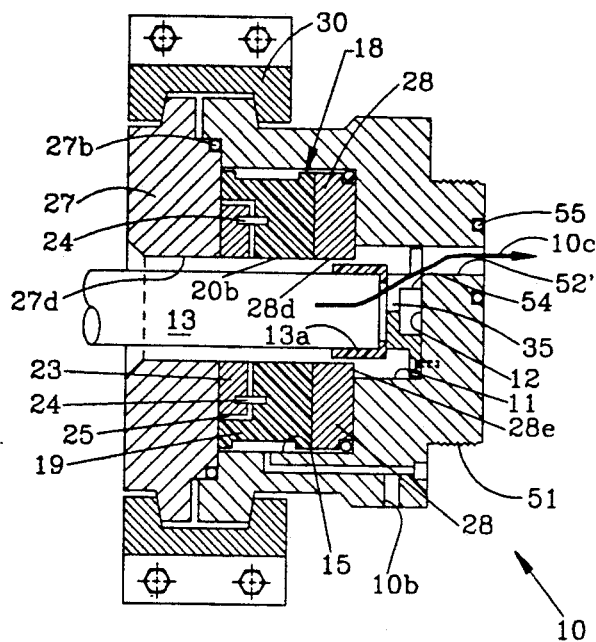
FIG. 1 is a sectional view of one form of the test head or pipe end closure of the present invention for enclosing one diameter pipe out a group of pipes within a predetermined range of pipe diameters with an arrangement to maintain to a minimum the travel distance of the seal assembly for each diameter of pipe within the predetermined range.
Figure 2:
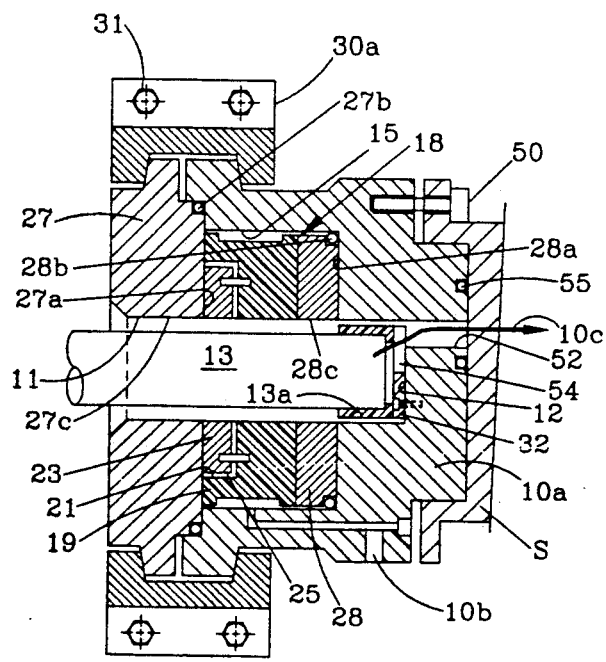
FIG. 2 is a sectional view similar to FIG. 1 illustrating the an arrangement of the test head of the present invention to receive the maximum diameter pipe size within the predetermined range of pipe diameters.

Attention is first directed to FIG. 2 wherein an assembled test head is illustrated at 10 and includes a longitudinal bore 11 extending longitudinally of the test head as illustrated. It will be noted that the bore 11 terminates at 12 in spaced relation to one end of the test head to receive and enclose a pipe end represented at 13. The pipe end 13 is schematically illustrated as threaded with a thread protector 13a fitting over the threads. The diameter of the bore 11 in the FIG. 1 form represents the maximum diameter of the bore 11 which is greater in diameter than the largest diameter of pipe diameters within the predetermined range of pipe diameters to be enclosed by the test head 10. In FIG. 2, the pipe end 13 with the thread protector 13a thereon represents the maximum diameter of pipe of the predetermined range of pipe diameters that will be accepted for fluid testing by the test head 10. It can be appreciated that a test head end 10 will be provided for each end of 13 of a pipe to be tested.

An inwardly opening recess is represented at 15 which surrounds the bore 11 as shown and terminates in longitudinal spaced relation to the ends of the longitudinal bore through which the pipe extends, such bore being formed by the assembly of components which form the test head 10.

A unitary seal ring assembly for the recess 15 is represented generally at 18 and includes an annular resilient body 19, which body is provided with an opening 20b for receiving the pipe 13 therethrough to be tested. An annular edge recess or counterbore 21 is formed in the resilient body 19 which recess extends outwardly from the pipe receiving opening 20b a suitable distance in the resilient body 19 as shown. The seal ring assembly also includes non-resilient backup arcuate segments 23 formed of any suitable non-resilient material which are mounted by any suitable means such as the pin 24 extending from each segment 23 and into the annular resilient body 19 as shown. The arcuate segments are circumferentially spaced in end to end relation within the recess 21 and around opening 20b in resilient body 19 and are positioned or secured in the annular edge recess 21. The counterbore 21 is larger in volume than the volume of the ring of non-resilient segments to form a volumetric space 25 surrounding or between the non-resilient segments 23 and the surface of the recess 23 in the resilient body 19, as shown. This resulting volumetric space or gap may vary as desired, but the volumetric relationship between the counterbore 21 and the ring of non-resilient segments positioned therein is such that the preferred spacing therebetween is not less than $\frac{1}{8}$ of an inch. This allows the resilient body 19 and the segments 23 to move toward sealing engagement with the pipe without applying an initial compressive load on the resilient body 19. This assists in increasing the effective sealing life of resilient member 19. In prior art seal assemblies which employ a resilient body and anti-extrusion elements, the resilient body surface and the surface of the non-resilient anti-extrusion elements contact and the resilient body is therefore initially subjected to a compressive load when pressure is applied which may result in quicker memory loss to the resilient body, thus possibly reducing its effective seal life. This volumetric space 25 enables the resilient body 19 and segments 23 to move together closer to the pipe to be sealed before a substantial compressive load is applied to the resilient body 19.

Means or members represented at 27 and 28 provide or form what may be termed seal plate surfaces represented at 27a and 28a respectively. The seal plate surface 27a abuts or fits closely adjacent the end surface of the non-resilient segments 23 and an annular portion of the resilient body 19 at one end of the recess 15 and the seal plate surface 28a abuts the opposite or other end surface of the resilient body 19 at the other end of the recess as shown.

The members 27 and 28 are sealably positioned in the test head 10 by means of the seals 27b and 28b and are also removably retained in position in the test head 10 whereby they may be readily replaced when a smaller diameter pipe than that shown in FIG. 1 and within the predetermined multiple diameter pipe range which can be accepted by the test head 10 is to be tested. Each means or member 27, 28 is provided with an opening 27c, 28c, respectively which varies in diameter in relation to the pipe diameter being tested within the predetermined pipe diameter range to be tested by the test head 10. After the member 28, seal ring assembly 19 and then member 27 are positioned with the portion 10a of the test head and assembled as illustrated in FIG. 1 suitable retaining means such as an ASME pressure vessel connection clamp 30 may be employed to secure the test head 10 in assembled relation, such clamp being provided in two semi-circular half portions having opposed mating projections 30a that can be engaged together by any suitable means such as nuts and bolts 31 or the like to secure the test head 10 in assembled relation.

The longitudinal bore 11 in the test head, as previously mentioned, is of a diameter greater than the largest diameter of the pipe diameters within the predetermined range to be tested by the test head. It is also of a suitable diameter to accept a thread protector such as that represented at 13a in the FIGS. 1-3 forms of the test head which is of substantial advantage as it is not uncommon for threaded, unprotected pipe to be damaged when inserting or removing the pipe in the testing operation so that the threaded portion has to be cut off and the threads recut. The bore 11 is of suitable diameter to accept a coupling, when one is employed. It is also to be noted that suitable means such as a bumper plate 35 can be positioned adjacent the end 12 of the longitudinal bore in the FIGS. 1-3 forms to position the pipe end 13 so that the thread protector or coupling extends longitudinally into the opening 28c of the member 28 to avoid contact with the annular bottom edge 28e of the member 28 when the pipe test has been completed and upon withdrawal of the pipe from the test head, and without interfering with the seal body 19 sealing with the pipe.

The portion 10a of the test head is provided with a passage 10b to receive fluid pressure to form an initial preset position of the seal with the pipe end 13 as an initial step in the test procedure. Thereafter, the pipe is filled with test fluid in any suitable manner well known in the art and the pressure is increased on the seal and the test fluid to inhibit leakage around the seal as will be described while the pipe is fluid pressure tested to the desired pressure.

It should be noted that while the member 27 is shown as being of a unitary piece to form a closure and provide a seal plate surface 27a, it could be in the form of a separate closure with a separate member providing the seal plate surface 27a thereon.

When a pipe 13 having a diameter smaller than the maximum diameter within the predetermined range accepted by head 10, as illustrated in FIG. 1, is to be positioned in the test head 10, the member 27, seal ring assembly 19 and member 28 are removed from the recess 15 and a member 27 and 28 as illustrated in FIG. 2 is employed which have a smaller opening 27d, 28d respectively for receiving the smaller diameter pipe end as represented at 13 in FIG. 2. Also the resilient body 19 of the seal ring assembly 18 will have a corresponding smaller opening as represented at 20b in FIG. 2.

This reduces the effective diameter of the longitudinal bore 11 in the test head 10 adjacent the members 27, 28 and seal assembly 19 to reduce the radial extent that the seal assembly 19 must travel or contract before sealing engagement with the pipe 13. The annular edge seal plate surfaces extend into the bore 11 as shown in FIG. 1 also provide support for the seal ring assembly 19 from its fully retracted position to substantially adjacent the pipe to be sealingly engaged. This aids in reducing possible damage to the resilient body 19 and in reducing extrusion of the resilient member 19 under pre-set seal pressure. Additionally, the abutment plate or spacer means 35 is of a different configuration, where necessary, to assure that the end of a thread protector or coupling is within the opening 28d of the member 28 as illustrated in FIG. 2 to inhibit contact between the annular extending edge of the thread protector or a coupling where one is employed, and the depending or lower annular edge of the member 28 which extends into the longitudinal bore 11 and as represented at 28e. In FIG. 2, the test head 10 is shown as provided with threads 10b for securing with a support, not shown.

In FIG. 3 the test head is again represented at 10 and similar components are provided with similar numerals. It will be noted that the non-resilient segments 23 shown in FIGS. 1 and 2 are rectangular in cross-section, whereas they are illustrated as being generally "L" shaped in FIG. 3. The volumetric space 21 in the FIG. 3 form is also suitably configured to conform with the shape of the segments to provide a volumetric space 25 which accommodates substantial movement of the resilient body 19 before engagement with the non-resilient segments 21 as the seal ring assembly is moved to sealing position with the pipe diameter to be tested. In some situations, it may be desirable to provide some contact between the resilient member 19 and non-resilient segments 21 to better position the non-resilient segments and such contact could be provided by small projections extending from the resilient body to be adjacent or contact the segment surfaces without substantially reducing the volumetric space therebetween and without interfering with substantial movement of the resilient body 19 as it is contracted by pressure to sealing position with the pipe 13.

As noted previously the longitudinal bore 11 is larger than the maximum diameter of the pipe within the predetermined range to be accepted by test head 10, and the openings 27c and 28c in members 27 and 28 and opening 20 in resilient body vary depending upon the maximum diameter on the pipe, including thread protectors or couplings with the predetermined range of pipe diameters. The preferred diametrical clearance between the openings 20b, 27c and 28c and the maximum outside diameter on the pipe to be tested, including a thread protector or a coupled end pipe, will vary depending on the maximum outside diameter and may, for example, be within the range of about $\frac{1}{4}$" to $1\frac{1}{2}$" to provide satisfactory results. Other suitable clearances can be employed which do not materially reduce the life of the resilient body 19 or inhibit proper sealing or which do not substantially increase the test time to an undesirable level.

Quite often pipe from a steel mill will have a crooked end, and the present invention enables crooked end pipe to be received within the test head while reducing the likelihood of contact with the resilient seal member to damage it during entry of the pipe into the test head or withdrawal therefrom.

Any suitable range of pipe diameters may be accepted within a single test head. For example, a test head for testing from $2\frac{3}{8}$" to $9\frac{5}{8}$" pipe can be employed. Likewise, a test head fitting any range from $\frac{5}{8}$" pipe to a reasonable predetermined maximum can be provided, so that any pipe diameter range may be selected for testing by test heads of the present invention designed to receive the pipe range. The present invention will test over the thread protector and seal off and will test plain end, upset or other special pipe. It also eliminates the necessity of having a test head for each separate diameter pipe and reduces the amount of travel of the seal ring assembly before sealing is accomplished with pipe diameter which is within the predetermined range, but smaller than the maximum diameter pipe that can be received in the test head thus assisting reducing possible damage to the seal. It also decreases the friction between the non-resilient segments and the resilient body to enable the resilient body to expand more rapidly to retracted position after the seal pressure is removed therefrom. As noted previously, the segments are mounted on the resilient body in circumferential end to end spaced relation about the opening so that as the seal assembly is collapsed or moved, the segments will close circumferentially and contact adjacent their circumferential ends to provide support for the resilient body as it moves to and remains in sealing relation with the pipe. The volumetric space between the resilient body and segments mounted thereon in all forms of the invention reduces, if not substantially eliminates, the tendency of the resilient body to move into the circumferential spacing between the segments or otherwise cause damage thereto as the elastomer body is contracted toward the pipe since inward movement of the resilient body 19 also moves the segment ends towards each other and reduces the end spacing opportunity for the elastomer to move thereinto. In other words, the time of contact between the segments and the resilient body is reduced.

Figure 3:
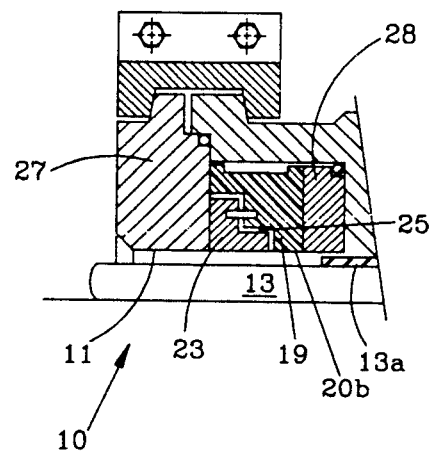
FIG. 3 is a one-quarter sectional view similar to FIG. 2 but illustrating an alternate form of the non-resilient segments of the seal assembly.

FIGS. 1-3 disclose a test head structure that encloses each end of a pipe for fluid testing. Any suitable well known structure or means may be used to support the test heads and pipe or test heads can be self-clamping or self-retaining on pipe.

Figure 4:
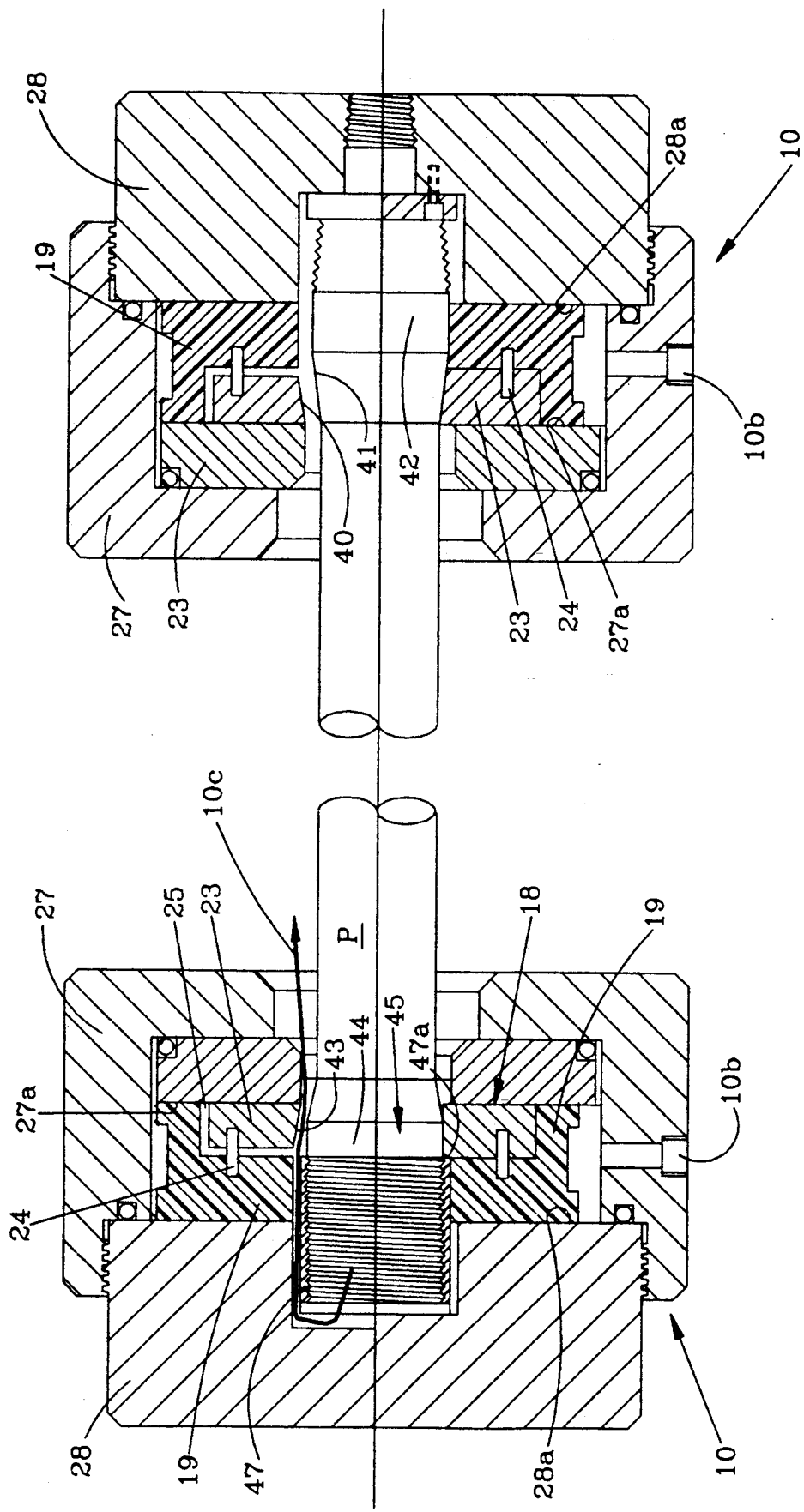
FIG. 4 illustrates an embodiment of the present invention for use with upset pipe and which may be positioned on a pipe rack, oil drum or any other suitable means during use and does not require any restraint of the test head or special support for fluid testing of a tubular member.

In the FIG. 4 embodiment, components similar to those illustrated in FIGS. 1-3 are represented by like numerals. The top half of each test head of FIG. 4 shows the seal ring assembly in retracted position and the bottom half of each sectional view illustrates the relationship of the non-resilient segments and resilient body to the upset portions when the seal is collapsed to sealing relation with the pipe. The pipe to be tested can be supported on a pipe rack or the like to enable the test heads to be readily positioned on the pipe ends and disengaged therefrom after the fluid test. After the FIG. 4 test heads are applied to each end, when fluid pressure is applied through 10b to set the seal ring assembly to sealingly engage the pipe P, the test heads 10 are held in position on the pipe by the segments 23 engaging the upset portion adjacent each pipe end, or by engaging the projecting edge 47a of a coupling at one end and the tapered portion 41 of the pipe upset portion 42 adjacent the other pipe end as illustrated on the right lower half in FIG. 4. It will be noted that the inner annular edge of the segments 23 adjacent at least one of the test heads is tapered as shown at 40 to conform with the annular taper 41 on the upset portion 42 of the pipe. On the left-hand portion it will be noted that arcuate surfaces 43 on the inner circumferential edge of the non-resilient segments 23 are positioned so as to abut the annular surface 44 on the upset 45 on the pipe P when the resilient member 19 seals with the coupling 47. Also the inner annular edge 23c of the segments abuts the radially projecting annular edge 48 on the coupling 47. Thus, the test heads are secured on the pipe against removal by the internal test pressure within the pipe during a test sequence.

Figure 5:
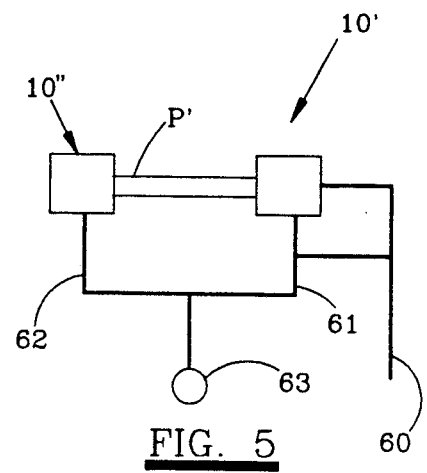
FIG. 5 is a partial schematic of a test sequence to fluid test a pipe.

FIG. 5 is a partial schematic view. In testing pipe it is customary for test heads 10′ and 10″ of the present invention to be positioned on each end of a pipe P′ for fluid testing thereof. By way of example, it is preferred that the seal ring assembly 18 be pressured to a suitable pressure such as 1,000 PSI to pre-set the seal assemblies in each head adjacent the pipe P′ ends. If the test head 10″ is provided with a vent valve in a well known manner, the seal ring assembly 18 in 10′ and 10″ may be both actuated to initially seal with the pipe ends. If desired, the seal assembly 18 in head 10′ may be left open and as fill fluid is inserted into the head 10′ through line 60 the air from pipe P′ may be evacuated through the open seal in the head 10′ as represented by the arrow 10c in the FIG. 4 form or in the FIGS. 1 and 2 form. It can also be appreciated that the test fluid may be either hydraulic or gas, such as nitrogen or the like.

After the pipe P′ has been evacuated and filled with fluid, the seal ring assemblies 18 in each head may be moved to sealing position. The seal ring assemblies are pre-set by inserting gas or hydraulic fluid through the lines 61 and 62 which communicate with the passage 10b previously described, in each test head to effect presetting of the seals.

After the pipe P′ has been filled with test fluid, the test fluid in the pipe P′ and the seal pressure supplied to passage 10b in each head 10′ and 10″ are simultaneously increased to the desired test pressure thus balancing the pressure on the seal ring assembly in each test head with the test pressure. After the pipe has been tested a predetermined time well known to those skilled in the art, the test pressure and seal assembly pressure is released in a well known manner to enable the test fluid to evacuate the pipe P′ and to enable the seal pressure to evacuate through the lines 61, 62 so that the seal ring assemblies may retract.

To further assist in moving the seal ring assemblies to their retracted position as soon as possible suitable suction means such as schematically represented at 63 may be employed to assist in withdrawing the seal fluid pressure from the passage 10b and lines 61 and 62 that communicate with the seal assembly. The pumps, fluid source of the seals and pipe, and other components are omitted as any suitable form may be used which is well known to those skilled in the art.

The volumetric spacing that surrounds the non-resilient segments in the seal ring assembly aids in expansion of the resilient member by more quickly disengaging the resilient body 19 from the segments, thus reducing the frictional resistance therebetween. Also, the means forming seal plate surfaces 27a, 28a serves as guides for aiding in centralizing and guiding the pipe into the test head in a manner to reduce if not substantially eliminate contact of the pipe with the resilient body 19 as it is inserted and withdrawn.

Where the present invention is to be used to test a flow line in a process plant to test for leaks, a suitable plug, or stopper, may be positioned at a desired location to stop flow through the line, and a single test head of the present invention received around one end of the flow line to enable the leak test.

The test head 10 of the FIGS. 1-3 forms may be supported on any suitable support, one of which is represented at S in FIG. 2, by any suitable means such as bolts 50 in FIG. 2, threads 51 in FIG. 1, or by an ASME clamp such as illustrated at 30 in the drawings. The support may have a longitudinally extending vent passage 52 for venting fluid as represented at 10c in FIG. 1 and in this event a suitable passage 52′ may be provided at one end of the test head and passage 54 through the adapter 32 or 35 to communicate with the vent passage 52. A seal ring 55 is provided to seal between the test head 10 and the support.

The foregoing disclosure and description of the invention are illustrative and explanatory thereof, and various changes in size, shape and materials as well as in the details of the illustrated construction may be made without departing from the spirit of the invention.

What is claimed is:

1. A test head for enclosing the end of any one pipe of a group of pipes within a predetermined range of pipe diameters to fluid test the pipe comprising:

a longitudinal bore extending longitudinally of the test head to receive and enclose the pipe end, the longitudinal bore being greater in diameter than the largest diameter of pipe diameters within the predetermined range of pipe diameters to be enclosed by the test head;

an inwardly opening annular recess surrounding the bore in the test head and terminating in longitudinal spaced relation to the ends of the longitudinal bore;

a unitary seal ring assembly for the recess;

passage means in the test head for conducting fluid pressure to contract said unitary seal ring assembly to seal with the pipe to be tested;

said unitary seal ring assembly including an annular resilient body having an opening for receiving the pipe to be tested therethrough and an annular recess in said resilient body extending from the pipe receiving opening, at least one ring of non-resilient, movable segments and means to mount said movable segments in the recess of said resilient body for movement of said segments and resilient body into engagement with the pipe to be tested;

said non-resilient segments being mounted in said recess in said resilient body to provide a volumetric space between said non-resilient segments and resilient body to enable said resilient body and non-resilient segments to move closer to the pipe in response to fluid pressure in the passage means in the test head before said resilient body and non-resilient segments contact in a manner which applies a substantial compressive load to said resilient body for sealing engagement with the pipe; and means forming seal plate surfaces adjacent each end of the recess, said seal plate surfaces having an opening therein to receive the pipe to be tested therethrough, said opening varying in diameter in relation to the diameter of pipe being tested within the multiple diameter pipe range and said means being replaceable to provide an opening clearance for the particular pipe diameter being tested within the multiple pipe diameter range and which opening reduces the diameter of the longitudinal bore to less than its maximum diameter when necessary to provide support for said unitary seal ring assembly as it contracts to sealing position on the pipe.

2. A test head for enclosing a pipe end to fluid test the pipe comprising:

a longitudinal bore extending longitudinally of the test head to receive and enclose the pipe end;

an inwardly opening annular recess surrounding the bore in the test head and terminating in longitudinal spaced relation to the ends of the longitudinal bore;

a unitary seal ring assembly for the recess;

said unitary seal ring assembly including an annular resilient body having an opening for receiving the pipe to be tested therethrough and an annular recess in said resilient body extending from the pipe receiving opening, at least one ring of non-resilient, movable segments and means to mount said movable segments in the recess of said resilient body for movement of said segments and resilient body into engagement with the pipe to be tested;

passage means in the test head for conducting fluid pressure to contract said unitary seal ring assembly to seal with the pipe to be tested;

suction means for communication with said passage means in the test head for withdrawing fluid pressure from said passage means to assist in moving said unitary seal ring assembly from contracted position; and means forming seal plate surfaces adjacent each end of the recess, said seal plate surfaces having an opening therein to receive the pipe to be tested therethrough, and to position said seal plate surface in close proximity to the pipe being tested to provide support for said unitary seal ring assembly as it contracts to sealing position on the pipe.

3. An assembly for fluid testing pipe comprising:

a pipe test head;

a longitudinal bore extending longitudinally of said test head to receive and enclose the end of the pipe to be tested;

an inwardly opening annular recess surrounding the bore in said test head;

a unitary seal ring for the recess;

said unitary seal ring assembly including an annular resilient body having an opening for receiving the pipe to be tested therethrough and an annular recess in said resilient body extending from the pipe receiving opening, at least one ring of non-resilient, movable segments and means to mount said movable segments in the recess of said resilient body for movement of said segments and resilient body into engagement with the pipe to be tested;

passage means in the test head for conducting fluid pressure to contract said unitary seal ring assembly to seal on the pipe to be tested; and suction means for communicating with the passage means in the test head for withdrawing the fluid pressure from said passage means and to assist in moving the unitary seal ring assembly from contracted position.

* * * * *